United States Patent Office 3,637,559
Patented Jan. 25, 1972

3,637,559
METHYL METHACRYLATE POLYMER-IN-MONOMER COMPOSITION
Paul S. Pinkney, West Chester, Pa., assignor to E. I. du Pont de Nemours and Company, Wilmington, Del.
No Drawing. Continuation-in-part of application Ser. No. 705,225, Feb. 13, 1968, which is a continuation of application Ser. No. 437,307, Mar. 4, 1965, both now abandoned. This application Sept. 29, 1969, Ser. No. 862,083
Int. Cl. C08f 45/52, 17/00
U.S. Cl. 260—28.5      9 Claims

ABSTRACT OF THE DISCLOSURE

Quick-hardening, durable coating compositions of the substantially 100 percent solids type are formulated from methyl mehacrylate monomer/polymer sirup, a methacrylate compound having at least three methacrylate ester groups, paraffin wax, titanium dioxide, a substituted aniline activator, a benzoyl or chlorobenzoyl peroxide, and preferably a hindered phenol stabilizer.

CROSS-REFERENCE TO RELATED APPLICATIONS

This is a continuation-in-part of U.S. application Ser. No. 705,225, filed Feb. 13, 1968, which is a continuation of U.S. application Ser. No. 437,307, filed Mar. 4, 1965, both now abandoned.

BACKGROUND OF THE INVENTION

Considerable attention is presently being devoted to the preparation of protective and decorative coating compositions which may be applied under factory mass production conditions onto various building materials, such as interior and exterior metal building panels and siding, asbestos siding, plywood, and the like. The essential property requirements for such compositions are demanding. The compositions must provide long-term durability and decorativeness; must be capable of being rapidly applied; must be capable of drying or hardening rapidly, preferably without needing heating at elevated temperatures; and desirably should be capable of being applied and dried or hardened with conventional equipment.

Methyl methacrylate polymers are commonly used to prepare coating compositions such as paints, lacquers and enamels, primarily because methyl methacrylate polymers provide decorative coatings having long-term durability. Heretofore, such coating compositions usually have been either solutions of polymer in volatile organic solvents, or equeous dispersions of polymer particles. Although these prior art methyl methacrylate polymer coating compositions have attained considerable commercial acceptance, primarily for post-construction application onto building materials, practitioners of the art have long recognized inherent deleterious properties which severely limit, or prohibit, the use of these compositions in factory mass production techniques. For example, in ordinary paints and lacquers, the liquid medium must be evaporated which causes considerable delay in the hardening time of the coating. Moreover, there is a limit to the amount of polymer which can be incorporated into the liquid medium, which in turn often leads to the necessity of applying several coats to attain a desired finished coating thickness. Also the presence of volatile organic solvents which must be evaporated creates fire, explosion, and toxicity problems.

It has been recognized that the preparation of coating compositions from solutions of methyl methacrylate polymer dissolved in methyl methacrylate monomer should eliminate these problems since the solutions can be cast in any desired thickness and the liquid solvent for the polymer hardens by polymerization, and thus, does not have to be evaporated. Solutions of methyl methacrylate polymers in methyl methacrylate monomer are old in the art. Indeed, many prior art references suggest the use of methyl methacrylate polymer-in-monomer solutions as coating compositions. However, the actual use of such solutions has primarily been in the production of molded articles and relatively thick sheets. Use of the methyl methacrylate polymer-in-monomer solutions described in the prior art as coating compositions proves to be totally unsatisfactory. In most instances, when such solutions are applied to a substrate in relatively thin coatings the monomer evaporates before it can be polymerized, resulting in non-uniform, non-durable, solvent-susceptible coatings. These prior art solutions also quite often lack sufficient hiding power and possess an objectionable yellow color. In summary, the prior art provides no teaching of how solutions of methyl methacrylate polymer in methyl methacrylate monomer may be used to prepare practical, satisfactory coating compositions, especially coating compositions suitable for use in rapid mass production factory application techniques.

SUMMARY OF THE INVENTION

The present invention provides a liquid coating composition comprising (1) a methyl methacrylate polymer selected from the group consisting of methyl methacrylate homopolymers and methyl methacrylate copolymers derived from methyl methacrylate and copolymerizable monomer selected from the group consisting of alkyl acrylates of 4 to 16 carbon atoms, alkayl methacrylates of 5 to 16 carbon atoms, copolymerizable unsaturated carboxylic acids, acrylonitrile, vinyl acetate, vinyl chloride, vinyl fluoride, vinylidene chloride, vinyldene fluorde and mixtures thereof, said polymer containing at least 50 percent by weight of methyl methacrylate units and having an inherent viscosity of about 0.15–0.6, (2) about 1–9 parts, per part by weight of said polymer, of a monomer selected from the group consisting of alkyl acrylates of 4 to 16 carbon atoms, alkyl methacrylates of 5 to 16 carbon atoms, copolymerizable unsaturated carboxylic acids, acrylonitrile and vinyl acetate, said monomer being at least 50 percent by weight methyl methacrylate, (3) about 3–20 percent, based on the weight of said monomer, of a polymerizable methacrylate compound having at least three methacrylate ester groups, (4) about 0.1–2 percent, based on the weight of said monomer, of a paraffin wax having a melting point of up to about 65° C., said wax being partially soluble in said monomer at 22° C. and being present in an amount in excess of the amount necessary to saturate said monomer at 22° C., (5) 0 to about 50 percent, based on the volume of said composition, of dispersed pigment, (6) about 1–10 percent, based on the weight of polymerizable monomers, of a catalyst selected from the group consisting of benzoyl peroxide and bis(p-chlorobenzoyl) peroxide, and (7) from about 0.1 percent, based on the weight of polymerizable monomer, to about 1 percent, based on the weight of said composition, of an amine activator, said activator being a substituted aniline wherein each of the hydrogens bonded to the nitrogen and the hydrogen in the para position are replaced by hydrocarbyl. The unique compositions of this invention provide hard, abrasion-resistant, color-stable, weather-resistant coatings, which are especially suitable for application onto various building materials such as panels, siding, and the like by rapid mass production factory techniques.

DESCRIPTION OF THE INVENTION

The solution of a methyl methacrylate polymer in methyl methacrylate monomer may be prepared by any of the methods which are familiar to those skilled in the art, as for example, by the partial polymerization of methyl methacrylate monomer or by dissolving a preformed methyl methacrylate polymer in methyl methacrylate monomer.

The methyl methacrylate polymer may be either a homopolymer, that is, poly(methyl methacrylate), or a copolymer, that is, methyl methacrylate copolymerized with one or more copolymerizable monomers such as alkyl acrylates, alkyl methacrylates, copolymerizable unsaturated carboxylic acids, and other suitable copolymerizable ethylenically unsaturated monomers. Preferably, the methyl methacrylate polymer is either a homopolymer or a copolymer containing up to about 50 percent, by weight of said polymer, of at least one copolymerized alkyl acrylate and/or alkyl methacrylate monomer, in particular, alkyl acrylates containing from 4 to 16 carbon atoms such as methyl acrylate, ethyl acrylate, isopropyl acrylate, n-butyl acrylate, isobutyl acrylate, n-amyl acrylate, isoamyl acrylate, decyl acrylate, 2-ethyl hexyl acrylate, dodecyl acrylate, and substituted alkyl acrylates having halogen atoms, in particular chlorine or fluorine, on the alpha carbon atom, and the like; and/or alkyl methacrylates containing from 5 to 16 carbon atoms such as ethyl methacrylate, propyl methacrylate, n-butyl methacrylate, isobutyl methacrylate, n-amyl methacrylate, n-hexyl methacrylate, n-heptyl methacrylate, n-octyl methacrylate, 2-ethylhexyl methacrylate, decyl methacrylate, dodecyl methacrylate, and the like; up to about 10 percent of a copolymerizable unsaturated carboxylic acid such as methacrylic acid, acrylic acid, maleic acid, itaconic acid, crotonic acid, cinnamic acid, and the like; and up to about 10 percent of other suitable copolymerizable monomers such as acrylonitrile, vinyl acetate, vinyl chloride, vinyl fluoride, vinylidene chloride, vinylidene fluoride, and the like. The aforementioned alkyl acrylates and alkyl methacrylates which may be copolymerized with the methyl methacrylate are characterized by the formula

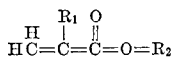

wherein $R_1$ is a member of the group consisting of hydrogen, the methyl group, and halogen, in particular chlorine or fluorine, wherein $R_2$ is an alkyl group having from 2 to 12 carbon atoms when $R_1$ is a methyl group, and having from 1 to 13 carbon atoms when $R_1$ is either hydrogen or a halogen atom. One preferred copolymer is a copolymer containing about 47 to 84.5 percent, by weight, methyl methacrylate, about 15 to 50 percent, by weight, of copolymerized ethyl acrylate, n-butyl methacrylate or 2-ethylhexyl acrylate, and about 0.5 to 3 percent by weight, of copolymerized methacrylic acid.

When a methyl methacrylate copolymer is desired, selection of the copolymerizable monomer, and the amount thereof to be incorporated into the copolymer are within the ordinary skill of one skilled in the art. As is thoroughly familiar to practitioners of the art, different copolymerized monomers impart different properties to the polymer, and thus polymers may be easily tailored to meet various requirements. Manufacturers and formulators of coating compositions are aware of the fact that inclusion of copolymerized monomers in the methyl methacrylate polymer usually tends to limit the outdoor durability of the resulting formulated coating compositions. However, there are many specialized coating compositions wherein it is desired to incorporate other copolymerized monomers into the polymer to produce a copolymer having certain desired properties.

The methyl methacrylate polymer must have an inherent viscosity of about 0.15–0.6 as determined at 20° C. in chloroform solution at a concentration of 0.5 gram of said polymer per deciliter, according to the method described by Billmeyer in Textbook of Polymer Chemistry, Interscience Publishing Inc., (1957), p. 128. It is impractical to prepare a methyl methacrylate polymer having an inherent viscosity of less than about 0.15. If the inherent viscosity is greater than about 0.6, the absolute viscosity of the resulting polymer-in-monomer solution is too high to be of practical value. Best results are obtained with methyl methacrylate polymers having inherent viscosities of about 0.2–0.4.

The solution of methyl methacrylate polymer in methyl methacrylate monomer must contain about 1–9 parts, by weight, of the monomer per part by weight of the polymer. If less than 1 part of monomer per part of polymer is used, the resulting solution is excessively viscous. If more than about 9 parts of monomer per part of polymer is used, the curing rate is so deleteriously decreased that the composition is totally unsuitable. Moreover, when more than about 9 parts of monomer per part of polymer is used, hold-out over porous substrates is inadequate, and an undesirable degree of shrinkage during hardening occurs, preventing the application of smooth finished coatings. Preferably, the solution should contain about 1.5–4 parts by weight of monomer per part by weight of polymer.

Other monomers which will copolymerize with the methyl methacrylate under the conditions selected for curing the polymer-in-monomer solutions, may be added to the composition of this invention. Such monomers include the alkyl acrylates, alkyl methacrylates, carboxylic acids, and other copolymerizable ethylenically unsaturated monomers, as defined and described above, regarding the monomers which may be copolymerized in the methyl methacrylate polymer. The same comments concerning precautions and effects in using such other monomers as mentioned there are applicable in selecting other monomers for use in combination with the methyl methacrylate monomer. Generally, the amount of such additional monomers, if any, should not exceed about 100 percent, based on the weight of the methyl methacrylate monomer, where alkyl acrylates and/or alkyl methacrylates are used, or about 10 percent where copolymerizable unsaturated carboxylic acids are used, or about 40 percent where other suitable monomers such as acrylonitrile, vinyl acetate, vinyl chloride, vinyl fluoride, vinylidene chloride, vinylidene fluoride, and the like are used. In other words, the monomer should be at least about 50 percent by weight methyl methacrylate.

The compositions of this invention must contain about 3–20 percent, based on the weight of monomer, of a polymerizable methacrylate compound containing at least three methacrylate ester groups. Omission of such a compound reduces the hardening time to such an extent that the resulting compositions cannot be applied in normal rapid mass production processes. Such polymerizable methacrylate compounds function as crosslinking agents, copolymerizing with the methyl methacrylate, and crosslinking the resulting polymer chains via the methacrylate ester groups of the said polymerizable methacrylate compound. As indicated, these methacrylate esters used in this invention as crosslinking agents are polymerizable monomers. In order to avoid any confusion between these agents and the methyl methacrylate monomer present in the polymer-in-monomer solution, these agents are termed herein as "polymerizable methacrylate compounds" instead of monomers.

Since the crosslinking reaction occurs via the methacrylate ester groups of the crosslinking agent, one skilled in the art would expect that a polymerizable methacrylate compound having at least three methacrylate ester groups would provide about the same rate of cure as an equivalent amount of a polymerizable difunctional acrylate or methacrylate ester groups (i.e., amounts of such compounds which would provide the same number of acrylate or methacrylate ester groups of the crosslinking agent per molecule of methylmethacrylate monomer in the solution). However, surprisingly, a polymerizable methacrylate compound having at least three methacrylate ester groups provides a markedly increased hardening rate as compared to an equivalent amount of a polymerizable difunctional methacrylate ester compound. Also, polymerizable methacrylate compounds having at least three methacrylate groups greatly improve the resistance to degradation at high temperatures, the solvent resistance, and the stain resistance of the finished coating.

As stated above, these polymerizable methacrylate compounds must contain at least three methacrylate ester groups per molecule for maximum effectiveness. There is no upper limit as to the number of methacrylate ester groups that may be contained in these compounds. However, most of the readily available preferred polymerizable methacrylate compounds of this invention contain from three to five methacrylate groups per molecule.

Suitable polymerizable methacrylate compounds include trimethylolpropane trimethacrylate, glycerol trimethacrylate, pentaerythrytol trimethacrylate, butanetriol trimethacrylate, pentanetriol trimethacrylate, 2-methyl-1,2,3-propanetriol trimethacrylate, 2-(hydroxymethyl) - 2-methylpropanetriol trimethacrylate, 3-(2-hydroxyethyoxy)propanediol trimethacrylate, 4-methyl-1,2,4-pentanetriol trimethacrylate, pentaerythrytol tetramethacrylate, 2 - (hydroxymethyl)-1,2,3-propanetriol tetramethacrylate, threitol tetramethacrylate, diglycerol tetramethacrylate, glucose pentamethacrylate, adonitol pentamethacrylate, arabitol pentamethacrylate, xylitol pentamethacrylate, phamnitol pentamethacrylate, and the like. In the practice of this invention, glycerol trimethacrylate, pentaerythrytol trimethacrylate, pentaerythrytol tetramethacrylate, glucose pentamethacrylate, and in particular, trimethylolpropane trimethacrylate are the preferred polymerizable methacrylate compounds having at least three methacrylate groups. In addition to the required amount of polymerizable methacrylate compound having at least three methacrylate groups, small amounts of dimethacrylate compounds such as ethylene dimethacrylate, or diethylene dimethacrylate may be added if desired.

The composition of this invention must contain about 3–20 percent, based on the weight of the methyl methacrylate monomer, of the polymerizable methacrylate compound having at least three methacrylate groups. Lower concentrations provide impractical curing rates unless excessive amounts of catalyst and activator are used. Higher concentrations provide no significant additional increases in curing rate as compared with concentrations within the defined range of 3–20 percent. The most preferred concentration range of the polymerizable methacrylate compound having at least three methacrylate groups is about 4–10 percent, based on the weight of methyl methacrylate monomer in the composition.

The composition of this invention must also contain paraffin wax in an amount excessive of the amount required to saturate the monomer portion of the composition. If the wax is omitted, or an insufficient amount of wax is used, the monomer evaporates from the composition before it can polymerize, resulting in non-uniform, non-durable, and solvent susceptible coatings. Also, if an insufficient amount of wax is used, the freshly applied composition tends to absorb atmospheric oxygen, which inhibits the necessary polymerization reaction. For this invention, the wax must be only partially soluble in the monomer at the normal temperature of application, i.e., about 22° C. It has been discovered that to obtain this partial solubility, the melting point of the wax must not exceed about 65° C. The most preferred waxes have a melting point of about 60.5 to 63.5° C. The minimum effective concentration of wax is about 0.1 percent, based on the weight of the monomer. Up to about 2 percent of wax, based on the weight of monomer, may be used. However, greater concentrations have a deleterious effect on the surface properties, e.g., scratch resistance, of the resulting coating. Concentrations of about 0.5 to 1 percent of wax, based on the weight of monomer, are usually adequate.

A preferred component of the composition of this invention is titanium dioxide pigment. Compositions prepared without titanium dioxide develop a generally undesirable yellow color upon exposure to light. Also, the titanium dioxide functions to impart opacity and hiding power to the compositions. Rutile or anatase titanium dioxide normally used in paints are suitable for use in this invention. A minimum of about 4 percent of dispersed titanium dioxide, based on the volume of the total composition, is needed to obtain satisfactory color stability. The preferred concentration range is about 6 to 15 percent based on the volume of the total composition.

In addition to titanium dioxide, various extender pigments may be added, such as, calcium carbonate, barytes, talc, mica, silica, clay, asbestos, calcium silicate, zinc oxide and barium metaborate. Preferably, grades of such extender pigments which have relatively low oil absorption are used. The total pigment concentration may be as high as about 50 percent, based on the volume of the total composition, or higher, but the polymer content of the final hardened coating preferably should be at least about 35 percent, based on the volume of the total composition, to insure that the pigment will be adequately bound. The preferred total pigment volume concentration is about 8 to 20 percent.

Colored pigments, dyes or toners may be used to obtain coatings of various colors, provided the coloring agents do not inhibit the hardening rate or appreciably shorten the useful pot life of the compositions. Furthermore, the coloring agents should have good light stability. Suitable coloring agents include red, brown, yellow and black synthetic iron oxides, phthalocyanine blue and green, quinanthrinone red, and chromium oxide green.

The compositions of this invention harden by the polymerization of the monomer. To obtain a satisfactory coating it is essential that a catalyst be used to promote this polymerization. Although many catalysts are known in the art which usually catalyze methyl methacrylate polymerization reactions quite adequately, only two particular catalysts have been discovered which are operable in this invention. It is critical to use either benzoyl peroxide or bis(p-chlorobenzoyl) peroxide. A minimum of about 1 percent of such a catalyst, based on the weight of all the polymerizable monomers present, is needed to obtain a rapid hardening rate. In some instances, as much as about 10 percent of catalyst is needed because of various substrates or composition components which have a retarding effect on the polymerization reaction. Preferably, about 2.5–5 percent, based on the weight of polymerizable monomer, of benzoyl peroxide or bis(p-chlorobenzoyl) peroxide is employed.

It is necessary to use an activator for the catalyst. The activator must be an amine which is a substituted aniline wherein each of the hydrogens bonded to the nitrogen and the hydrogen in the para position are replaced by hydrocarbyl. Such amines are represented by the formula:

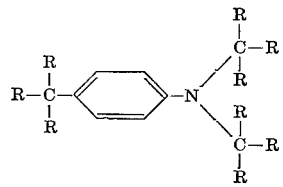

wherein R is hydrogen, an alkyl radical, or an aryl radical. Examples of such amines include N,N-diethyl-p-toluidine, p,p' - methylene bis - (N,N-dimethylaniline), N,N - bis(2 - hydroxypropyl)-p-toluidine, N,N-bis(2-hydroxyethyl) - p - toluidine, N,N,N′,N′-tetramethylbenzidene, and the like. N,N-dimethyl-p-toluidine is the preferred amine activator since it provides the most rapid hardening rate and causes a minimum of discoloration. At least about 0.1 percent of amine activator, based on the weight of polymerizable monomer, is needed to obtain a hardening rate suitable for rapid mass production factory application techniques. In some instances, it is necessary to use up to about 1 percent of amine activator, based on the weight of the total composition. Larger amounts of amine activator tend to produce an objectionable yellow color.

If the compositions of this invention are to be stored for any appreciable time prior to use, it is necessary to stabilize the compositions by incorporating therein a suitable stabilizer which will inhibit premature polymerization of the methyl methacrylate monomer. A limited degree of stabilization is obtained with either hydroquinone or the methyl ether of hydroquinone, used at a concentration of at least about 25 parts per million parts by weight of monomer and polymer (abbreviated hereinafter as "p.p.m."). However, far more satisfactory results are obtained with certain hindered phenols, particularly 2,4-dimethyl-6-tert.-butyl phenol and 2,6-ditert.-butyl-p-cresol. Such hindered phenols may be used at concentrations in the range of about 50 to 500 p.p.m., or preferably about 100 to 200 p.p.m.

Other ingredients may be added to the compositions of this invention to modify certain properties, as desired. For example, where it is desired to plasticize the resulting hardened composition, a monomeric plasticizer which is compatible with the polymer, may be added to the composition of this invention. Examples of such plasticizers are tributyl citrate, the dialkyl phthalates, the alkyl benzyl phthalates, and the like. The concentration of such a plasticizer should not exceed about 40 percent, based on the weight of the composition, since higher concentrations have an undesirable effect on the dirt retention of derived finishes. The leveling, sag resistance, and bubble release properties may be improved by the addition of minor amounts of inert volatile organic solvents for the polymer such as acetone and ethyl acetate. Other compatible polymeric and resinous substances such as vinyl chloride polymers and cellulose acetate butyrate may be added. Known pigment wetting agents and antifoam agents are other commonly used ingredients.

The compositions of this invention are useful for coating a wide variety of substrates, including the various metals, woods, hardboard, particle board, paper-overlaid substrates, asbestos cement, masonry, vinyl chloride polymers, polyurethanes, etc. Adhesion to most substrates is excellent. However, in some instances, the use of a suitable primer is required to provide adequate adhesion onto a smooth substrate such as a metal. Rough or porous substrates may require filling. This is preferably done with a reactive material such as an epoxy resin or a drying alkyd that becomes insoluble in methyl methacrylate. Use of such a filler minimizes "telegraphing" of the grain or other pattern of the substrate, and also minimizes formation of bubbles and pinholes in the final coat. With other substrates, such as unautoclaved asbestos cement, it is desirable to seal the substrate surface with a sealer to prevent contact of the coating composition with the substrate which can contain materials that interfere with the hardening polymerization reaction.

The compositions of this invention can be prepared by any convenient method. Usually the solution of methyl methacrylate polymer in methyl methacrylate monomer is prepared first and then the other components are added thereto. Conventional equipment such as pebble mills, 3 and 5 roll paint mills, Morehouse mills, sand mills and high speed mixers, can be used to disperse the titanium dioxide and other pigments into the solution. Preferably, the components are mixed into the composition in a closed system to minimize loss of methyl methacrylate monomer by evaporation. Inclusion of the paraffin wax in the pigment dispersion facilitates handling of the dispersion without excessive evaporation losses.

The polymerization reaction starts as soon as the peroxide catalyst and amine activator are contacted together in the composition. Therefore, these two ingredients are incorporated into the composition after all the other components have been added, and then the composition is coated immediately onto the substrate. Alternatively, two separate compositions which are identical, except that one contains the peroxide catalyst and the other contains the amine activator, are prepared. These two compositions are then mixed together immediately before application, or are applied simultaneously as described below, to effect the complete incorporation of all the critical components of the compositions of this invention. It should be carefully noted, that in no instance should the peroxide catalyst and amine activator be mixed together alone, since such a two component mixture produces an explosive reaction.

As noted above, the compositions of this invention may be completely prepared and then applied, or the composition may be prepared as a two-part composition in which the peroxide catalyst is contained in one separate part and the activator is contained in the other separate part. In the latter case, two compositions may be prepared which are identical except that one contains the peroxide catalyst and the other contains the amine activator. These two compositions are then mixed together either immediately before, during or after application. Thus, these two compositions may be applied via a two component spray gun having a pre-mixing chamber, to mix the two compositions immediately before application. These two compositions may also be mixed during application, as for example, by use of a two-headed spray gun. Alternately, these two compositions may be mixed after application, as for example, by spraying, curtain coating, etc. one of the compositions onto the substrate and then applying the other composition over the first coating. By this latter technique, the two compositions mix together by interdiffusion to obtain the compositions of this invention. Other techniques for preparation and application of the compositions of this invention will be obvious to those skilled in the art.

It is important that the compositions of this invention be exposed to circulating air immediately after they are applied onto the substrate. This is essential for prompt functioning of the wax to minimize loss of methyl methacrylate monomer by evaporation, and to prevent absorption of atmospheric oxygen which inhibits the polymerization reaction.

EXAMPLES OF THE INVENTION

This invention is further illustrated by the following examples which are given without any intention that the invention be limited thereto. All percentages are by weight.

EXAMPLE 1

This example, which is not within the scope of the invention, shows the effect of ethylene dimethacrylate as the sole agent to accelerate the hardening of the compositions. A solution of polymethyl methacrylate in methyl methacrylate monomer was prepared by the process described in British Pat. No. 870,191. It contained 35.8% of polymethyl methacrylate having an inherent viscosity of 0.35 as measured at 20° C. in chloroform solution at a concentration of 0.5 g. per deciliter. It also contained 25 p.p.m. of hydroquinone and 1.25% of ethylene dimethacrylate, both of which were added subsequent to the polymerization. A 4.35% slurry of paraffin wax ("Sunoco" 4412, M.P. 63.3° C.) was prepared by heating a stirred mixture of the wax and methyl methacrylate containing 25 p.p.m. of hydroquinone to 70° C. until the wax dissolved and then cooling the solution to room temperature. A dispersion of "Ti-Pure" R-100 rutile titanium dioxide paint pigment was prepared by stirring together the pigment, polymer solution, wax slurry, hydroquinone and methyl methacrylate and passing the resulting mixture through a three-roll paint mill. The resulting dispersion had the following composition by weight:

TiO₂—66.16%
Polymer—6.25%
Ethylene dimethacrylate—0.23%
Wax—0.26
Methyl methacrylate—27.10%
Hydroquinone—32 p.p.m.

This dispersion was mixed wtih 55% benzoyl peroxide in butyl benzyl phthalate ("Luperco" ABB), N,N-dimethyl-p-toluidine and additional methyl methacrylate, polymer solution and wax slurry to obtain the following coating compositions.

|  | Percent by weight | |
|---|---|---|
|  | A | B |
| TiO₂ | 52.28 | 52.28 |
| Polymer | 5.81 | 5.81 |
| Ethylene dimethacrylate | 0.22 | 2.66 |
| Wax | 0.23 | 0.23 |
| Methyl methacrylate | 36.14 | 33.70 |
| 55% benzoyl peroxide | 4.43 | 4.43 |
| N,N-dimethyl-p-toluidine | 0.89 | 0.89 |
| Hydroquinone | 0.0022 | 0.0023 |

In each case the amine was added only after the other ingredients had been thoroughly mixed. Vigorous mixing was continued for one minute after addition of the amine. Then films were spread at once on glass plates with a doctor knife set to provide a wet film thickness of 8 mils. In each case the time required for the film to become hard enough to resist scratching with the fingernail was noted. The film from composition A, containing about 0.6% crosslinking agent based on the monomer, hardened in 32.5 min., while that from composition B, containing about 7.9% crosslinking agent based on the monomer, required 17.5 min.

Unless indicated otherwise, the components used in the compositions prepared in the subsequent examples were the same as used in Example 1.

EXAMPLE 2

This example shows the application of coating compositions of this invention by spraying. It will also be noted that these compositions contain large volumes (30%) of pigment. The polymer solution and paraffin wax were the same as employed in Example 1. The procedure of Example 1 was used to prepare dispersions of titanium dioxide ("Ti-Pure" R-900) and calcium carbonate ("Duramite"). "Troykyd Antisettle," a silicate-type antisettling agent, was included in the calcium carbonate dispersion to retard settling of the pigments. The resulting dispersions had the following compositions:

|  | Percent by weight | |
|---|---|---|
|  | A | Y |
| TiO₂ | 67.26 |  |
| Calcium carbonate |  | 71.41 |
| "Troykyd Antisettle" |  | 0.43 |
| Wax | 0.20 | 0.29 |
| Ethylene dimethacrylate | 0.12 | 0.22 |
| Methyl methacrylate | 29.35 | 20.39 |
| Polymer | 3.07 | 6.02 |
| Hydroquinone | 0.0027 | 0.0028 |

These pigment dispersions were used along with 50% benzoyl peroxide in tricresyl phosphate ("Luperco" ATC), trimethylol-propane trimethacrylate, N,N-dimethyl-p-toluidine, a commercial antifoam agent ("Antifoam 66"), and additional polymer solution and monomer to prepare the following compositions:

|  | Percent by weight | | | | | |
|---|---|---|---|---|---|---|
|  | IA | IB | IIA | IIB | IIIA | IIIB |
| TiO₂ | 47.13 | 47.13 | 25.71 | 25.71 | 13.47 | 13.47 |
| Calcium carbonate |  |  | 16.49 | 16.49 | 25.92 | 25.92 |
| Antisettle |  |  | 0.10 | 0.10 | 0.16 | 0.16 |
| Polymer | 4.67 | 4.67 | 5.09 | 5.09 | 5.34 | 5.34 |
| Wax | 0.26 | 0.26 | 0.28 | 0.28 | 0.30 | 0.30 |
| Ethylene dimethacrylate | 0.18 | 0.18 | 0.20 | 0.20 | 0.20 | 0.20 |
| Trimethylolpropane trimethacrylate | 1.97 | 1.97 | 2.15 | 2.15 | 2.26 | 2.26 |
| Methyl methacrylate | 44.42 | 39.94 | 48.50 | 43.60 | 50.80 | 45.68 |
| 55% benzoyl peroxide |  | 5.82 |  | 6.36 |  | 6.66 |
| N,N-Dimethyl-p-toluidine | 1.34 |  | 1.46 |  | 1.54 |  |
| "Antifoam 66" | 0.0075 | 0.0075 | 0.0075 | 0.0075 | 0.0075 | 0.0075 |
| Hydroquinone | .0027 | .0026 | .0026 | .0026 | .0027 | .0026 |

The viscosities of these compositions were within the range of 15–22 cp. as determined with a Brookfield Viscosimeter using the No. 2 spindle at 60 r.p.m. Each pair of compositions was combined and applied to asbestos cement panels primed with an epoxy primer. Application was by spraying with a spray gun provided with two identical spray heads mounted on a common handle and having a common trigger and supply of 30 p.s.i. atomizing air. Each composition was fed from a pressure bottle with the pressures and flow control valves adjusted to provide a flow rate of 600 grams per minute of each composition. The heads were mounted so that the two sprays converged on the substrate when it was about six inches from the nozzles. The panels were coated while in a horizontal position. Coating thickness was 5–7 mils. The coatings, which contained 4.85–5.4% crosslinking agent based on the monomer, hardened in 10–15 min. so that they resisted scratching with the fingernail. Specular gloss at 60° varied from 15 to 28. They were unaffected by methyl ethyl ketone, a solvent for polymethyl methacrylate.

The coated panels were exposed at 45° south outdoors in Hialeah, Florida, along with panels coated with an acrylic latex house paint and an unsaturated polyester-styrene composition applied according to directions of the manufacturer with methyl ethyl ketone peroxide and cobalt naphthenate to effect curing. After one year none of the coatings showed checking, cracking, blistering, flaking, or dirt retention. Yellowness measurements were made with a Gardner Multi-Purpose Reflectometer used as a photoelectric tristimulus colorimeter to obtain reflectance readings, A, B, and G, using amber, blue and green filters. Yellowness Index, YI, was calculated from the following equation:

$$YI = \frac{100(A-B)}{G}$$

The good color stability of the compositions of this invention and latex coatings in comparison with the polyester coating is evident from the following data:

|  | Yellowness index | |
|---|---|---|
|  | Initial | After 1 year in Florida |
| Composition I | 11.0 | 6.2 |
| Composition II | 7.6 | 7.4 |
| Composition III | 7.7 | 10.1 |
| Acrylic latex paint | 5.7 | 8.0 |
| Polyester coating | 4.6 | 23.8 |

EXAMPLE 3

This example shows the marked superiority of the acrylic sirup coatings of this invention over conventional oil, alkyd and acrylic latex house paints and an unsaturated polyester-styrene coating in resistance to outdoor erosion. The coating compositions shown in the following table were prepared by passing mixtures of the ingredients except peroxide and amine through a Morehouse mill to disperse the pigments and then adding the peroxide paste, and finally, the amine. The polymethyl methacrylate solution, methyl methacrylate monomer and wax used were the same as employed in Example 1. "Silver Bond" B silica is a ground silica extender pigment.

| | Percent by weight | | | | |
|---|---|---|---|---|---|
| | A | B | C | D | E |
| TiO₂ ("Ti-Pure" R–900) | 16.06 | | | | |
| TiO₂ ("Ti-Pure" R–610) | | 28.87 | 23.53 | 23.67 | 23.64 |
| Calcium carbonate | | | 30.21 | | 15.16 |
| Silica ("Silver Bond" B) | | | | 29.73 | 14.86 |
| "Troykyd Antisettle" | | | 0.21 | 0.21 | 0.21 |
| Wax | 0.30 | 0.30 | 0.31 | 0.30 | 0.29 |
| Polymer | 25.78 | 20.58 | 11.56 | 11.63 | 11.60 |
| Ethylene dimethacrylate | 0.90 | 0.73 | 0.40 | 0.40 | 0.40 |
| Trimethylolpropane trimethacrylate | 2.44 | 2.26 | 1.50 | 1.44 | 1.49 |
| Methyl methacrylate | 51.54 | 44.16 | 29.98 | 30.32 | 30.05 |
| Hydroquinone | 0.0021 | 0.0017 | 0.0011 | 0.0011 | 0.0011 |
| 55% benzoyl peroxide | 3.2 | 2.9 | 1.9 | 1.9 | 1.9 |
| N,N-dimethyl-p-toluidine | 0.16 | 0.20 | 0.40 | 0.40 | 0.40 |

These acrylic sirup coatings were spread with a doctor knife at 8 mils an aluminum panels that had been primed with an oil-modified alkyd resin primer. They reached a pencil hardness of 4B in 10.5–16 minutes and H in 11.5–18 minutes. Control panels were coated with commercial paints: an acrylic latex house paint, a chalk-resistant oil house paint, an oil-modified alkyd exterior paint, and a polyester-styrene paint. Erosion rates were determined by exposing the panels for 3000 hours in an accelerated weathering unit, and measuring the resulting loss in weight.

Results were as follows:

| Coating: | Weight loss mg./ft.²/1000 hr. |
|---|---|
| A | 60 |
| B | 60 |
| C | 100 |
| D | 80 |
| E | 100 |
| Polyester paint | 300 |
| Acrylic latex paint | 370 |
| Chalk-resistant oil paint | 1100 |
| Alkyd paint | 1200 |

It is apparent from these results that as far as failure due to erosion is concerned the acrylic sirup coatings would be expected to have a useful life outdoors that is 3 to 5 times that of the polyester paint, 4 to 6 times that of the acrylic latex paint and 10 to 20 times that of the oil or alkyd paint.

EXAMPLE 4

This example shows the good color stability and chalking resistance of the acrylic sirup coatings of this invention during long exposure in an accelerated weathering unit. A dispersion of "Duramite" calcium carbonate was prepared with a three-roll paint mill using the polymethyl methacrylate solution and wax described in Example 1. It had the following composition:

| | Percent by weight |
|---|---|
| Calcium carbonate | 71.41 |
| Troykyd antisettle | 0.43 |
| Wax | 0.29 |
| Polymer | 6.02 |
| Ethylene dimethacrylate | 0.22 |
| Trimethylolpropane trimethacrylate | 1.24 |
| Methyl methacrylate | 20.39 |
| Hydroquinone | 0.0028 |

This was used along with a "Ti-Pure" R–900 rutile titanium dioxide dispersion prepared as described in Example 1 and the other ingredients indicated, to prepare coatings of the following composition:

| | Percent by weight | | | |
|---|---|---|---|---|
| | A | B | C | D |
| TiO₂ | 15.80 | 15.09 | 26.00 | 23.52 |
| Calcium carbonate | | 7.74 | | 30.18 |
| "Troykyd Antisettle" | | .05 | | 0.18 |
| Wax | 0.30 | 0.30 | 0.30 | 0.27 |
| Polymer | 26.00 | 22.40 | 21.50 | 12.00 |
| Ethylene dimethacrylate | 0.87 | 0.75 | 0.72 | 0.42 |
| Trimethylolpropane trimethacrylate | 2.45 | 2.30 | 2.21 | 1.43 |
| Methyl methacrylate | 51.20 | 48.12 | 46.05 | 29.91 |
| Hydroquinone | 0.0026 | 0.0026 | 0.0027 | 0.0027 |
| 55% benzoyl peroxide ("Luperco" ABB) | 3.22 | 3.02 | 2.90 | 1.88 |
| N,N-dimethyl-p-toluidine | 0.16 | 0.22 | 0.32 | 0.21 |

The amine in each case was added only after all the other components had been well mixed. Coatings spread on epoxy-primed asbestos cement panels at 8 mils hardened in 10–12 minutes. The coated panels along with similar panels coated with conventional paints were exposed for 2685 hours in an accelerated weatherometer, which included exposure to intense ultraviolet light in the exposure cycle. Initial and final yellowness index (YI) values were calculated as follows:

$$YI = \frac{102X - 84.72z}{y}$$

where $x$, $y$ and $z$ are the C.I.E. (International Commission on Illumination) tristimulus values determined with a General Electric Spectrophotometer. Chalking after exposure was rated on the 0–10 scale specified by the Federation of Societies for Paint Technology. Results were as follows:

| Coating | Yellowness index | | Chalking rating after exposure |
|---|---|---|---|
| | Initial | Exposed | |
| A | 5.9 | 3.7 | 9+ |
| B | 4.0 | 2.6 | 9 |
| C | 4.8 | 2.5 | 8 |
| D | 5.1 | 3.9 | 8 |
| Acrylic latex paint | 4.3 | 4.5 | 2 |
| Chalking oil paint | 12.1 | 7.2 | 3 |
| Chalk-resistant oil paint | 9.7 | 6.0 | 6 |

None of the coatings showed any cracking, checking, flaking or blistering. It is apparent from these results that resistance of the acrylic sirup coatings of this invention to yellowing on exposure to ultraviolet light is excellent. Resistance to chalking is better than that of conventional paints.

EXAMPLE 5

This example shows the essentiality of an effective paraffin wax in the acrylic sirup coatings of this invention. A dispersion of "Ti-Pure" R–100 rutile titanium dioxide was prepared by passing a mixture of the pigment, methyl methacrylate and the polymethyl methacrylate solution of Example 1, through a Morehouse mill. The resulting dispersion had the following composition:

| | Percent by weight |
|---|---|
| TiO₂ | 50.12 |
| Polymer | 12.33 |
| Methyl methacrylate | 37.13 |
| Ethylene dimethacrylate | 0.42 |
| Hydroquinone | 0.0014 |

This dispersion was used along with the wax slurry of Example 1 and other ingredients indicated to make up the following coating compositions:

| | Percent by weight | |
|---|---|---|
| | A | B |
| TiO₂ | 45.0 | 45.0 |
| Polymer | 11.1 | 11.1 |
| Wax | | 0.25 |
| Ethylene dimethacrylate | 0.38 | 0.38 |
| Trimethylolpropane trimethacrylate | 2.10 | 2.10 |
| Methyl methacrylate | 38.42 | 38.17 |
| Hydroquinone | 0.0015 | 0.0016 |
| 55% benzoyl peroxide ("Luperco" ABB) | 2.5 | 2.5 |
| N,N-dimethyl-p-toluidine | 0.5 | 0.5 |

The amine was added only after the other ingredients had been thoroughly mixed. Vigorous mixing was continued for one minute after addition of the amine. Then each composition was spread on a tared glass plate with a doctor knife set to provide a wet film thickness of 8 mils. The coated plate was weighed promptly. It took about one minute to cast each film and obtain its "initial" weight. Weighings were made at intervals of one-half or one minute during hardening of each film. The film from composition A reached a pencil hardness of HB in 7 minutes after addition of the amine, which was 5 minutes after the initial weighing. During this 5-minute period the film lost 30.3% of its weight due to evaporation of methyl methacrylate. Thus, essentially all of the methyl methacrylate in the coating composition was lost by evaporation. The resulting film disintegrated when placed in methyl ethyl ketone. This is evidence that no significant degree of polymerization had taken place during hardening of the film. The film was noticeably yellow in color. The film from composition B reached a pencil hardness of HB in 14 minutes after addition of the amine. There was no loss in weight after the initial weighing. The hard film was more nearly white than the yellowed film obtained without wax. It was unaffected by methyl ethyl ketone.

It is apparent from these results that a paraffin wax is an essential component of the acrylic sirup coatings of this invention. Without such a wax the coating compositions function only as lacquers in which the methyl methacrylate serves as a volatile solvent.

EXAMPLE 6

This example illustrates use of a curtain coater for application of a coating composition containing silica gel to control gloss, zinc oxide to inhibit growth of mildew and a hindered phenol stabilizer to extend the pot life of the peroxide-containing coating composition. The ingredients indicated were mixed with the polymethyl methacrylate solution of Example 1 using a Cowles Dissolver. Mixing was continued until the wax was completely dissolved. The resulting dispersion was cooled to room temperature and diluted with methyl methacrylate to a viscosity of 27 seconds in a No. 4 Zahn Cup. The diluted dispersion had the following composition:

| | Percent by weight |
|---|---|
| TiO$_2$ ("Ti-Pure" R–900) | 27.56 |
| Silica ("Syloid" 162) | 2.63 |
| Zinc oxide (A20 ZZZ-33) | 7.35 |
| Wax ("Sunoco" 4412) | 0.52 |
| Polymer | 14.85 |
| Ethylene dimethacrylate | 0.53 |
| Trimethylolpropane trimethacrylate | 2.12 |
| Methyl methacrylate | 44.43 |
| Hydroquinone | 0.0015 |
| 2,4-dimethyl-6-tert-butylphenol | 0.01 |

The diluted dispersion was divided into two approximately equal parts, A and B. To A was added 1.65 parts of N,N-dimethyl-p-toluidine per 100 parts of diluted dispersion. To B was added 7.8 parts of "Cadox" B-160 (55% benzoyl peroxide in butyl benzyl phthalate) per 100 parts of diluted dispersion. The viscosities of A and B were then 20 and 21 sec., respectively, in a No. 4 Zahn Cup. A and B were applied to various substrates with a Steinemann Twin-Head Pressure Curtain Coater, B first and then A in equal thicknesses. Coating rates were 140, 210 and 280 ft./min. to obtain cured coatings having thicknesses of 8, 6 and 4 mils, respectively. Within 12 min. at 26° C. the coatings became hard enough to resist scratching with the fingernail. Specular gloss at 60° was 12–18. The substrates coated were redwood, red cedar and hemlock siding, Douglas fir plywood and high- and medium-density hardboard. The wood siding was primed with either a short- or long-oil alkyl primer and the medium-density hardboard was primed with a short-oil alkyd primer to avoid bubbles and pinholes in the coatings. The high-density hardboards did not require priming. The exterior-grade Douglas fir plywood was first filled with a catalyzed epoxy filler, applied with a rubber squeegee. Some panels were then coated further with "Rhoplex" AC–34 acrylic latex and some with "Rhoplex" AC–33 acrylic latex by spraying to obtain a dry film thickness of 1–1.5 mils. These panels were baked for 45 min. at 145° F. After application of 8-mil coatings of the above described composition, specimens measuring 3 x 6 inches were cut for use in an accelerated grain cracking test. This test involved soaking the specimen in water for 8 hours and then drying it in a circulating air oven at 145° F. for 16 hours. As cracks developed, the total length of crack in each specimen was measured after each cycle. Development of 6 inches of crack in a coating was taken to indicate failure of the coating in this test. The coating on an epoxy-filled unprimed panel failed in three cycles. Coatings on the epoxy-filled panels primed with the acrylic latexes did not fail in twenty-five cycles. The coatings were hard and abrasion resistant. Color stability was excellent. The yellowness index of a coating on high-density hardboard remained essentially unchanged after exposure of the panel for 1600 hours in an accelerated weathering unit which included high-intensity ultraviolet light in the exposure cycle. The coatings were unaffected by methyl ethyl ketone. Neither component of the coating composition showed an increase in viscosity in 24 hours at 26° C.

EXAMPLE 7

This example shows the effectiveness of titanium dioxide as a color stabilizer in the acrylic sirup coatings of this invention. The ingredients indicated were mixed with the polymethyl methacrylate solution of Example 1 using a Cowles Dissolver. Mixing was continued until the wax dissolved, but the temperature was not allowed to rise above 50° C. The resulting silica dispersion was cooled to room temperature and diluted with methyl methacrylate to a viscosity of 32 sec. in a No. 4 Zahn Cup. The diluted dispersion had the following composition:

| | Percent by weight |
|---|---|
| Silica ("Syloid" 162) | 4.34 |
| Wax ("Sunoco" 4412) | 0.52 |
| Polymer | 25.68 |
| Ethylene dimethacrylate | 0.92 |
| Trimethylolpropane trimethacrylate | 3.12 |
| Methyl methacrylate | 65.41 |
| Hydroquinone | 0.0025 |
| 2,4-dimethyl-6-tert.-butylphenol | .0080 |

The diluted dispersion was divided into two approximately equal parts, A and B. To A was added 1.22 parts of N,N-dimethyl-p-toluidine per 100 parts of dispersion. To B was added 8.6 parts of "Cadox" B–160 (55% benzoyl peroxide in butyl benzyl phthalate) per 100 parts of dispersion. A and B were applied with a Steinemann Twin Pressure Curtain Coater to one-half of a high-density hardboard panel previously coated with 8 mils of the pigmented acrylic sirup coating described in Example 6. B was applied first and then A, each at a thickness of 2.5 mils. The coating hardened in 12 min. Yellowness index measurements were made with a Colormaster Differential Colorimeter. The top of the panel, which was coated only with the pigmented composition of Example 6, had an initial yellowness index of 8.2. The bottom of the panel, to which the clear coating had also been applied, had an initial yellowness index of 12.6. The clear coating was noticeably more yellow to the eye than was the pigmented coating. The panel was exposed for 42 hrs. in a Xenon-Arc Weatherometer (Atlas Electric Devices Co.) to intense ultraviolet light. The yellowness index of the top of the panel remained essentially unchanged, while that of the bottom of the panel rose to 29.3. There was little further change in yellowness index of either end of the panel after a total exposure of 920 hrs. in the accelerated weathering unit.

EXAMPLE 8

This example illustrates use of a comonomer to obtain acrylic sirup coatings having improved flexibility. The polymethyl methacrylate solution and wax dispersion described in Example 1 were used to prepare a dispersion of rutile titanium dioxide in a Morehouse mill. The dispersion was mixed with the additional ingredients indicated to obtain the following coating compositions:

| | Percent by weight | |
|---|---|---|
| | A | B |
| TiO₂ ("Ti-Pure" R 900) | 22.61 | 22.61 |
| Polymer | 17.85 | 17.85 |
| Wax | 0.26 | 0.26 |
| Ethylene dimethacrylate | 0.66 | 0.66 |
| Trimethylolpropane trimethacrylate | 1.85 | 1.85 |
| Methyl methacrylate | 52.77 | 38.06 |
| 2-ethylhexyl acrylate | | 14.71 |
| Hydroquinone | 0.002 | 0.002 |
| 55% benzoyl peroxide ("Luperco" ABB) | 3.34 | 3.34 |
| N,N-dimethyl-p-toluidine | .066 | 0.66 |

The amine was added only after the other ingredients had been thoroughly mixed. It was mixed in for one minute. Then each coating composition was spread on a glass plate and on a panel of "Duraply" paper-overlaid Douglas fir plywood with a doctor knife set to provide a wet film thickness of 8 mills. The coatings from both compositions reached a pencil hardness of H in 13 minutes after addition of the amine. After the coatings had aged for four days, hardness was measured with a Tukon Hardness Tester and found to be 14 and 7 Knoop Units for A and B, respectively. A ⅛" wide strip of coating A could be bent very little without breaking. A similar strip of coating B could be folded double and the fold pressed between the finger and thumb without breaking.

EXAMPLE 9

This example shows the excellent abrasion resistance of the coatings obtained from the compositions of this invention. A composition was prepared by passing a mixture of the ingredients except peroxide paste and amine through a Morehouse mill to disperse the pigments and then adding the peroxide paste and, finally, the amine. The polymethyl methacrylate solution and wax used were the same as employed in Example 1. The resulting mixture had the following composition:

| | Percent by weight |
|---|---|
| TiO₂ ("Ti-Pure" R-900) | 23.95 |
| Calcium carbonate ("Duramite") | 31.09 |
| Wax | 0.30 |
| Polymer | 11.93 |
| Ethylene dimethacrylate | 0.43 |
| Trimethylolpropane trimethylacrylate | 1.38 |
| Methyl methacrylate | 28.67 |
| 55% benzoyl peroxide ("Luperco" ABB) | 1.86 |
| N,N-dimethyl-p-toluidine | 0.39 |
| Hydroquinone | 0.001 |

The coating composition was spread on glass and on high-density tempered hardboard with a doctor knife set to give an 8-mil wet film. A pencil hardness of H was reached in 14.5 minutes. This is equivalent to about 7 Knoop Units. In one hour the hardness had reached 12 Knoop Units, and in five days 19 Knoop Units. After eight days the abrasion resistance of the coating on hardboard was measured with a Taber Abraser using "Calibrase" CS17 wheels with a 1000-gram load on each wheel. The abrasion rate was shown by a weight loss of 60 mg./1000 cycles. This compared with 70 mg./1000 cycles for a commercial pigmented unsaturated polyester-styrene coating aged for six weeks.

EXAMPLE 10

This example shows the preparation of a pigmented dispersion by dissolving a methyl methacrylate/methacrylic acid copolymer and wax in methyl methacrylate and immediately stirring in the pigment. It also shows the superiority of 2,4-dimethyl-6-tert-butylphenol as a stabilizer. The polymer employed was a 98.9:1.2 methyl methacrylate/methacrylic acid copolymer having an inherent viscosity of 0.2 as determined at 20° C. in chloroform solution at a concentration of 0.5 gram per deciliter. The methyl methacrylate contained either 50 p.p.m. of 2,4-dimethyl-6-tert-butylphenol or 25 p.p.m. of hydroquinone. The trimethylolpropane trimethacrylate contained either 120 p.p.m. of the former or 60 p.p.m. of the latter stabilizer. To 1500 parts of stabilized methyl methacrylate were added 1162 parts of polymer in finely divided bead form and 22.8 parts of wax. The mixture was warmed and stirred with a Cowles Dissolver until the polymer was in solution. Then 716 parts of rutile titanium dioxide was added and stirring was continued for 10 min. at 50–53° C. to effect dispersion. The dispersion was diluted with 614 parts of stabilized methyl methacrylate and cooled. Two such dispersions were prepared, one containing 2,4-dimethyl-6-tert.-butylphenol and the other containing hydroquinone as stabilizer. Coating compositions were prepared with the above dispersions and the other ingredients indicated.

| | Percent by weight | | |
|---|---|---|---|
| | A | B | C |
| TiO₂ ("Ti-Pure" R 900) | 15.80 | 15.80 | 15.80 |
| Polymer | 25.63 | 25.63 | 25.63 |
| Wax ("Sunoco" 4412) | 0.50 | 0.50 | 0.50 |
| Hydroquinone | | 0.0076 | 0.0076 |
| 2,4-dimethyl-6-tertbutylphenol | 0.015 | | |
| Trimethylolpropane trimethacrylate | 2.45 | 2.45 | 2.45 |
| Methyl methacrylate | 51.75 | 51.76 | 50.94 |
| 55% benzoyl peroxide ("Cadox" B 160) | 3.50 | 3.50 | 3.50 |
| N,N-dimethyl-p-toluidine | 0.35 | 0.35 | 1.17 |

These were spread on glass at 8 mils with a doctor knife about one minute after addition of the amine. Times to reach a pencil hardness of 4B were noted, and yellowness index measurements were made after an aging period of two weeks using a Colormaster Differential Colorimeter. Results were as follows:

| | A | B | C |
|---|---|---|---|
| Hardening time, minutes | 11 | 20 | 11.5 |
| Yellowness index | 2.6 | 4.3 | 6.0 |

Although B contained only half as much stabilizer as A, it hardened much more slowly. With hydroquinone the amine concentration had to be increased to 1.17% (C) to obtain a hardening rate approximately equivalent to that of A. The yellowness index obtained with hydroquinone was significantly higher than with the substituted phenol, particularly when enough amine was used to obtain the higher curing rate. The effects of the two stabilizers on the pot life of a peroxide-containing composition such as would be used in curtain coating were determined with compositions like A and B but containing 6.5% "Cadox" B-160 and no amine. Hydroquinone at 76 p.p.m. provided a useful pot life of 2.5 days as compared with 5 days for the hindered phenol at 150 p.p.m. It is apparent from these results that hydroquinone and 2,4-dimethyl-6-tert-butylphenol are equivalent on an equal weight basis as stabilizers for peroxide containing compositions, but that the latter can be used at much higher concentrations without adversely affecting hardening rate and color.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. A liquid methyl methacrylate polymer-in-monomer coating composition which provides a coating of substantially equal weight which composition comprises (1) a methyl methacrylate polymer selected from the group consisting of methyl methacrylate homopolymers and methyl methacrylate copolymers derived from methyl methacrylate and copolymerizable monomer selected from the group consisting of alkyl acrylates of 4 to 16 carbon atoms, alkyl methacrylates of 5 to 16 carbon atoms, copolymerizable unsaturated carboxylic acids, acrylonitrile, vinyl acetate, vinyl chloride, vinyl fluoride, vinylidene chloride, vinylidene fluoride and mixtures thereof, said polymer containing at least 50% by weight of methyl methacrylate units and having an inherent viscosity of 0.15 to 0.6.

(2) 1 to 9 parts, per part by weight of said polymer, of a monomer selected from the group consisting of alkyl acrylates of 4 to 16 carbon atoms, alkyl methacrylates of 6 to 16 carbon atoms, copolymerizable unsaturated carboxylic acids, acrylonitrile and vinyl acetate, said monomer being at least 50% by weight methyl methacrylate, (3) 3 to 20%, based on the weight of said monomer, of a polymerizable methacrylate compound having at least three methacrylate ester groups, (4) 0.1 to 2%, based on the weight of said monomer, of a paraffin wax having a melting point of up to 65° C., said wax being partially soluble in said monomer at 22° C. and being present in an amount in excess of the amount necessary to saturate said monomer at 22° C., (5) 0 to 50%, based on the volume of said composition, of dispersed pigment, (6) 1 to 10%, based on the weight of polymerizable monomers, of a catalyst selected from the group consisting of benzoyl peroxide and bis(p-chlorobenzoyl) peroxide, and (7) from 0.1%, based on the weight of polymerizable monomers, to 1%, based on the weight of said composition, of an amine activator, said activator being a substituted aniline wherein each of the hydrogens bonded to the nitrogen and the hydrogen in the para position are replaced by hydrocarbyl.

2. The coating composition of claim 1 in which 1.5 to 6 parts, per part by weight of said polymer, of said monomer, are present, 4 to 10%, based on the weight of said monomer, trimethylolpropane trimethacrylate is present, 0.5 to 1%, based on the weight of said monomer, of said paraffin wax is present, at least 4%, based on the volume of said composition, of dispersed titanium dioxide is present, and 2.5 to 5%, based on the weight of polymerizable monomers, of peroxide catalyst is present.

3. The coating composition of claim 2 in which the methyl methacrylate polymer is a homopolymer having an inherent viscosity of 0.2 to 0.4, 1.5 to 4 parts of methyl methacrylate monomer per part by weight of said polymer are present, said wax has a melting point of 60.5 to 62.5° C., 6 to 15%, based on the volume of said composition, of dispersed titanium dioxide is present, said activator is N,N-dimethyl paratoluidine, and 100 to 200 parts, per million parts by weight of said polymer and monomer, of hindered phenol selected from the group consisting of 2,4-dimethyl-6-tert.-butyl phenol and 2,6-ditert.-butyl-p-cresol are present.

4. A two-part liquid methyl methacrylate polymer-in-monomer coating composition which provides a coating of substantially equal weight comprising at least two separate parts which, in combination, comprise (1) a methyl methacrylate polymer selected from the group consisting of methyl methacrylate homopolymers and methyl methacrylate copolymers derived from methyl methacrylate and copolymerizable monomers selected from the group consisting of alkyl acrylates of 4 to 16 carbon atoms, alkyl methacrylates of 5 to 16 carbon atoms, copolymerizable unsaturated carboxylic acids, acrylonitrile, vinyl acetate, vinyl chloride, vinyl fluoride, vinylidene chloride, vinylidene fluoride and mixtures thereof, said polymer containing at least 50% by weight methyl methacrylate units and having an inherent viscosity of 0.15 to 0.6, (2) 1 to 9 parts, per part by weight of said polymer, of a monomer selected from the group consisting of alkyl acrylates of 4 to 16 carbon atoms, alkyl methacrylates of 5 to 16 carbon atoms, copolymerizable unsaturated carboxylic acids, acrylonitrile and vinyl actate, said monomer being at least 50% by weight methyl methacrylate, (3) 3 to 20%, based on the weight of said monomer, of a polymerizable methacrylate compound having at least three methacrylate ester groups, (4) 0.1 to 2%, based on the weight of said monomer, of a paraffin wax having a melting point of up to 65° C., said wax being partially soluble in said monomer at 22° C. and being present in an amount in excess of the amount necessary to saturate said monomer at 22° C., (5) 0 to 50%, based on the volume of said composition, of dispersed pigment, (6) 1 to 10%, based on the weight of polymerizable monomers, of a catalyst selected from the group consisting of benzoyl peroxide and bis (p-chlorobenzoyl) peroxide, and (7) from 0.1%, based on the weight of polymerizable monomers, to 1%, based on the weight of said composition, of an amine activator, said activator being a substituted aniline wherein each of the hydrogens bonded to the nitrogen and the hydrogen in the para position are replaced by hydrocarbyl, said peroxide catalyst being contained in one of said separate parts, and said activator being contained in another of said separate parts.

5. The two-part coating composition of claim 4 in which 1.5 to 6 parts, per part by weight of said polymer, of said monomer are present, 4 to 10%, based on the weight of said monomer, of trimethylolpropane trimethacrylate is present, 0.5 to 1%, based on the weight of said monomer, of said paraffin wax is present, at least 4%, based on the volume of said composition, of dispersed titanium dioxide is present, and 2.5 to 5%, based on the weight of polymerizable monomers, of peroxide catalyst is present.

6. The two-part coating composition of claim 5 in which the methyl methacrylate polymer is a homopolymer having an inherent viscosity of 0.2 to 0.4, 1.5 to 4 parts of methyl methacrylate monomer per part by weight of said polymer are present, said wax has a melting point of 60.5 to 62.5° C., 6 to 15%, based on the volume of said composition, of dispersed titanium dioxide is present, said activator is N,N-dimethyl para-toluidine, and 100 to 200 parts, per million parts by weight of said polymer and monomer, of hindered phenol selected from the group consisting of 2,4-dimethyl-6-tert.-butyl phenol and 2,6-ditert.-butyl-p-cresol are present.

7. A process of coating a substrate which comprises applying thereto a liquid methyl methacrylate polymer-in-monomer coating composition which provides a coating of substantially equal weight which composition comprises (1) a methyl methacrylate polymer selected from the group consisting of methyl methacrylate homopolymers and methyl methacrylate copolymers derived from methyl methacrylate and copolymerizable monomer selected from the group consisting of alkyl acrylates of 4 to 16 carbon atoms, alkyl methacrylates of 5 to 16 carbon atoms, copolymerizable unsaturated carboxylic acids, acrylonitrile, vinyl acetate, vinyl chloride, vinyl fluoride, vinylidene chloride, vinylidene fluoride and mixtures thereof, said polymer containing at least 50% by weight of methyl methacrylate units and having an inherent viscosity of 0.15 to 0.6, (2) 1 to 9 parts, per part by weight of said polymer, of a monomer selected from the group consisting of alkyl acrylates of 4 to 16 carbon atoms, alkyl methacrylates of 5 to 16 carbon atoms, copolymerizable unsaturated carboxylic acids, acrylonitrile and vinyl acetate, said monomer being at least 50% by weight methyl methacrylate, (3) 3 to 20%, based on the weight of said monomer, of a polymerizable methacrylate compound having at least three methacrylate ester groups, (4) 0.1 to 2%, based on the weight of said monomer, of a paraffin wax having a melting point of up to 65° C., said wax being partially soluble in said monomer at 22° C. and being present in an amount in excess of the amount necessary to saturate said monomer at 22° C., (5) 0 to 50%, based on the volume of said composition, of dispersed pigment, (6) 1 to 10%, based on the weight of polymerizable monomers, of a catalyst selected from the group consisting of benzoyl peroxide and bis (p-chlorobenzoyl) peroxide, and (7) from 0.1%, based on the weight of polymerizable monomers, to 1%, based on the weight of said composition, of an amine activator, said activator being a substituted aniline wherein each of the hydrogens bonded to the nitrogen and the hydrogen in the para position are replaced by hydrocarbyl.

8. The process of claim 7 in which the coating composition contains 1.5 to 6 parts, per part by weight of said polymer, of said monomer, 4 to 10%, based on the weight of said monomer, of trimethylolpropane trimethacrylate, 0.5 to 1%, based on the weight of said monomer, of said paraffin wax, at least 4%, based on the volume of said composition, of dispersed titanium dioxide, and 2.5 to 5%, based on the weight of polymerizable monomers, of peroxide catalyst.

9. The process of claim 8 in which the methyl methacrylate polymer is a homopolymer having an inherent viscosity of 0.2 to 0.4, 1.5 to 4 parts of methyl methacrylate monomer per part by weight of said polymer are present, said wax has a melting point of 60.5 to 62.5° C., 6 to 15%, based on the volume of said composition, of dispersed titanium dioxide is present, said activator is N,N-dimethyl para-toluidine, and 100 to 200 parts, per million parts by weight of said polymer and monomer, of hindered phenol selected from the group consisting of 2,4-dimethyl-6-tert.-butyl phenol and 2,6-butyl-p-cresol are present.

References Cited

UNITED STATES PATENTS

| | | | |
|---|---|---|---|
| 2,456,759 | 12/1948 | White | 260—80.78 |
| 2,703,776 | 3/1955 | Leader | 260—885 |
| 2,739,122 | 3/1956 | Kennerly | 260—45.95 |
| 3,070,564 | 12/1962 | Roeser | 260—41 B |

FOREIGN PATENTS

| | | | |
|---|---|---|---|
| 774,807 | 5/1957 | Great Britain | 260—28.5 |
| 870,191 | 6/1961 | Great Britain | 260—28.5 |
| 975,587 | 11/1964 | Great Britain | 260—28.5 |

OTHER REFERENCES

Chemical Abstracts, vol. 64: 19919C.

Schildknicht: Vinyl and Related Copolymers, Wiley & Sons, 1952, pages 208–211.

MORRIS LIEBMAN, Primary Examiner

S. L. FOX, Assistant Examiner

U.S. Cl. X.R.

117—161 VB; 260—41 B, 885

PO-1050
(5/69)

UNITED STATES PATENT OFFICE
CERTIFICATE OF CORRECTION

Patent No. 3,637,559         Dated January 25, 1972

Inventor(s) Paul S. Pinkney

It is certified that error appears in the above-identified patent and that said Letters Patent are hereby corrected as shown below:

Column 17, Line 17, "6" should read -- 5 --.

Signed and sealed this 13th day of June 1972.

(SEAL)
Attest:

EDWARD M. FLETCHER, JR.
Attesting Officer

ROBERT GOTTSCHALK
Commissioner of Patents